SEISMIC PROSPECTING SYSTEM

Original Filed Sept. 25, 1963 6 Sheets-Sheet 1

JAMES T. KENNEY
INVENTOR.

BY Reed L. Lawler
ATTORNEY

SEISMIC PROSPECTING SYSTEM

Original Filed Sept. 25, 1963 6 Sheets-Sheet 2

JAMES T. KENNEY
INVENTOR.

BY Reed & Lawlor
ATTORNEY

SEISMIC PROSPECTING SYSTEM

Original Filed Sept. 25, 1963 6 Sheets-Sheet 3

JAMES T. KENNEY
INVENTOR.

BY

ATTORNEY

SEISMIC PROSPECTING SYSTEM

Original Filed Sept. 25, 1963 6 Sheets-Sheet 4

JAMES T. KENNEY
INVENTOR.

BY Rud L. Lawlor
ATTORNEY

SEISMIC PROSPECTING SYSTEM

Original Filed Sept. 25, 1963 6 Sheets-Sheet 5

JAMES T. KENNEY
INVENTOR.

BY Reed B. Lawler
ATTORNEY

SEISMIC PROSPECTING SYSTEM

Original Filed Sept. 25, 1963 6 Sheets-Sheet 6

JAMES T. KENNEY
INVENTOR.

BY

Reed C. Taylor
ATTORNEY

United States Patent Office

Re. 26,825
Reissued Mar. 17, 1970

26,825

SEISMIC PROSPECTING SYSTEM

James T. Kenney, Arcadia, Calif., assignor, by mesne assignments, to United Geophysical Corporation, Pasadena, Calif., a corporation of Delaware Original No. 3,283,845, dated Nov. 8, 1968, Ser. No. 311,486, Sept. 25, 1963. Application for reissue Nov. 4, 1968, Ser. No. 786,494

Int. Cl. G01v *1/14*

U.S. Cl. 181—.5 34 Claims

Matter enclosed in heavy brackets [ ] appears in the original patent but forms no part of this reissue specification; matter printed in italics indicates the additions made by reissue.

*ABSTRACT OF THE DISCLOSURE*

*A mobile seismic generator having a hammer which is driven downwardly by the force of an expanding gas to impact a plate on the earth is provided with a counterbalancing mass which is driven upwardly at the same instant. The reaction force on the transporting vehicle is thereby minimized so that the vehicle does not rise off the ground and then fall to produce an undesired impact. The hammer is prevented from causing undesired impact on rebound by hydraulic catcher means which temporarily retains the hammer in an elevated position on rebound.*

This invention relates to systems for applying shocks or impacts to the surface of the earth to create seismic disturbances for use in obtaining seismographic records for mapping subterranean earth structures. More particularly, this improvement relates to improved means for producing such earth shocks and to improved portable means for positioning the apparatus at a succession of desired locations during field operations.

In using seismic techniques for investigating subterranean areas for mineral deposits or for other purposes, seismic waves in the form of a short succession of pulses are customarily created at different times and at various points along the surface of the earth and these waves are recorded at various points at the surface of the earth after the waves have been deflected, as by reflection, refraction, or diffraction from subterranean discontinuity such as from the interfaces between adjacent geological layers of different elasticity or density or from fault zones. Usually the seismic waves are generated by explosion of small charges of dynamite at points called shot points and the waves are detected at receivers, that is, seismometers or geophones, at a spread of receiving points. The received waves are recorded in such a way that their times of travel from the shot point can be measured. From a knowledge of the spacial relations between the shot points and the receiving points and the velocities of transmission of various waves and times of travel of the waves, the points at which the waves have been deflected either by refraction, reflection or diffraction, can often be ascertained with a high degree of reliability.

In many areas in which geophysical exploration is conducted in accordance with seismic methods, considerable difficulty is experienced in measuring such travel times because the amplitude and character of the seismic waves that are generated depend in part upon local conditions existing at the shot point. Furthermore, the seismic waves that are detected after deflection by subterranean irregularities are often masked by noise and ground roll that is generated at the shot time. Furthermore, in most seismic wave prospecting systems, the waves are generated at substantial depths below the surface of the earth in order to avoid erratic measurements that might otherwise arise because of the uncertainty of the correction required to take into account the time of travel of the waves in the upper layer, which is often a low-velocity "weathered layer." Furthermore, when attempts are made to make measurements by means of seismic waves generated at the surface instead of beneath the weathered layer, difficulty is encountered because of the fact that the weathered-layer correction varies from point to point and because of the loss of energy in the transmission of the waves through the weathered layer.

The numerous problems mentioned above and also others can be overcome by providing a system in which seismic waves are generated by impacting the surface of the earth at a large number of mutually spaced impact points in rapid succession and to record the waves from each shot before waves are generated at the next shot. More particularly it is desirable to provide an arrangement for generating seismic waves at one point of the surface of the earth; recording those waves at a group of seismometers after the waves have traveled downwardly into the earth and have been deflected upwardly from both shallow strata and from deep strata; and then repeating the generating process and the recording process over and over by generating the seismic waves either at the same shot point or at different shot points located at various horizontally-spaced-apart points at the surface of the earth. By various means well known in the art the records of the received waves may be combined in order to obtain an average effect that minimizes discrepancies otherwise occuring because of differences in surface conditions at individual points of impact and differences in the weathered layer at such points.

In accordance with the invention of Raymond A. Peterson, disclosed and claimed in patent application Serial No. 306,795, filed September 5, 1963, seismic waves are generated at the surface of the earth by impacting the surface of the earth with a blow created by the expansion of gas under pressure against a hammer which is then "fired" or shot downwardly against the earth to shock it by a single impact and thus to create a single short succession of seismic wave pulses. In that invention the hammer is shot against a plate which has been laid across the surface of the earth at the point of impact in order to distribute the force applied by the impact over an area of the earth larger than the cross-sectional area of the hammer alone. The use of such a plate increases the efficiency of the conversion of the impact energy into seismic wave energy. It also results in pulses which are more uniform in shape from one impact to another. In that invention, the impactor, including the hammer and the earth plate, are carried on a trailer or other wheeled vehicle in such a way that they can be rapidly moved from point to point to generate seismic waves at a large number of points in a short time.

In accordance with the present invention an arrangement is made whereby a counterbalancing mass is fired upwardly at the same time that the hammer is fired downwardly to apply an impact to the earth. In this way the reaction on the vehicle is minimized so that is does not rise greatly at the time of impact and then fall to produce undersirable impacts on the earth later than the desired impact. In the most effective arrangement the hammer or impacting member and counterbalancing or recoil member are in the form of pistons slidable in a common cylinder mounted on the truck and the mass and excursion of the counterbalancing mass are so proportioned in relation to the mass and excursion of the hammer, that the hammer applies its impact before the counterbalancing mass reaches the upper end of its movement. In this way the ultimate upward recoil of the cannon is delayed until after the impact blow has been delivered to the earth plate.

Further, means are provided to temporarily catch the impactor in its upper position following impact so that it cannot return to impact the plate a second time until a second impact is desired.

The present invention also utilizes means provided for raising and lowering the impactor on the vehicle so as to facilitate its easy transport from one impact or shot point to another. Also, means are provided for securing the impacting equipment in a raised position to facilitate driving the equipment over long distances without danger of the equipment falling to the ground accidentally while being transported.

While the apparatus of the present invention is designed primarily for rapid travel from one impact point to another in order to facilitate the generation of seismic waves at a large number of shot points and the recording of the seismic waves at a fixed setup of seismometers, it can also be used to generate a succession of seismic waves rapidly at a single impact point. Thus, several impacts may be made at the same impact point.

Other objects of the invention and various associated features of construction will become apparent to those skilled in this art upon reference to the following specification and the accompanying drawings wherein a presently preferred embodiment is illustrated.

Figure 3:
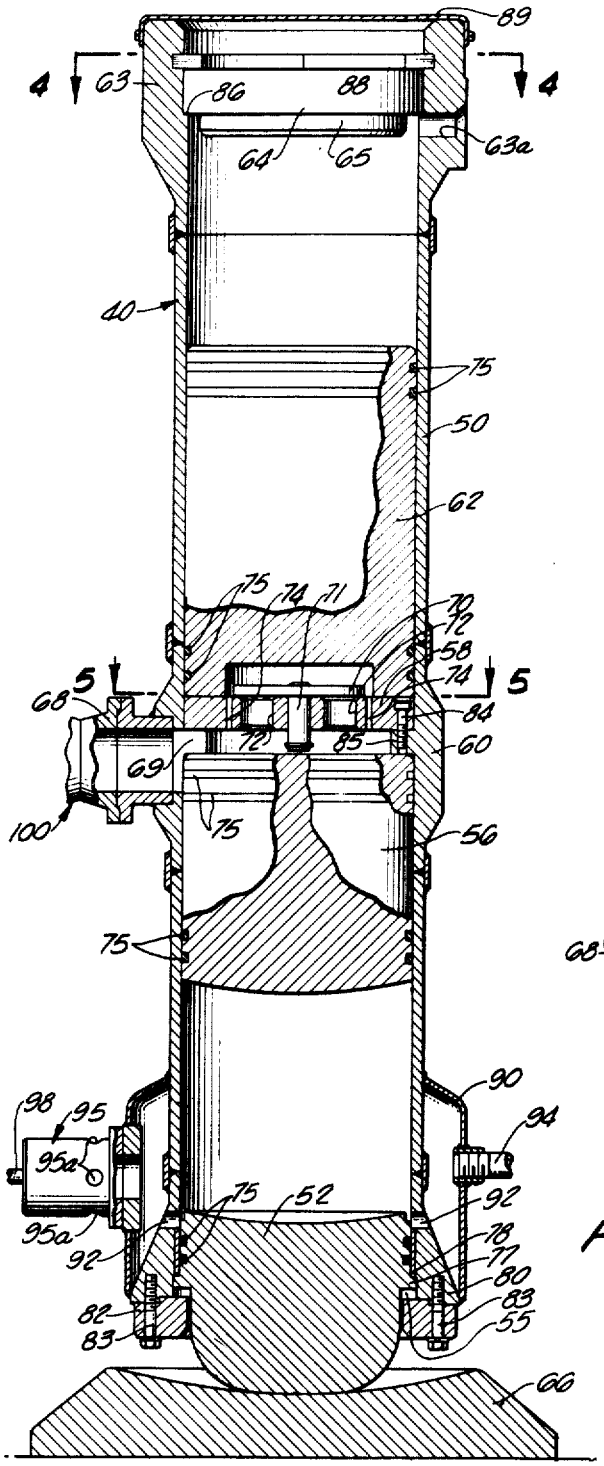
FIG. 3 is a vertical section taken approximately on the line 3—3 of FIG. 1 to show the internal construction of the shock producing mechanism.
Figure 4:
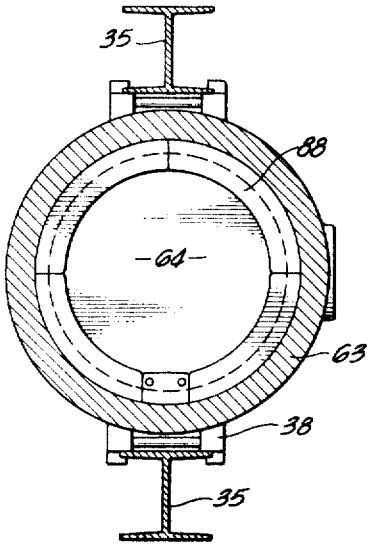
Figure 5:
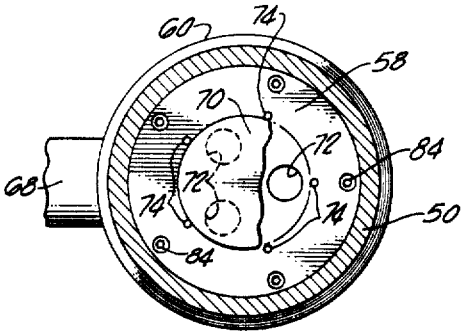
Figure 6:
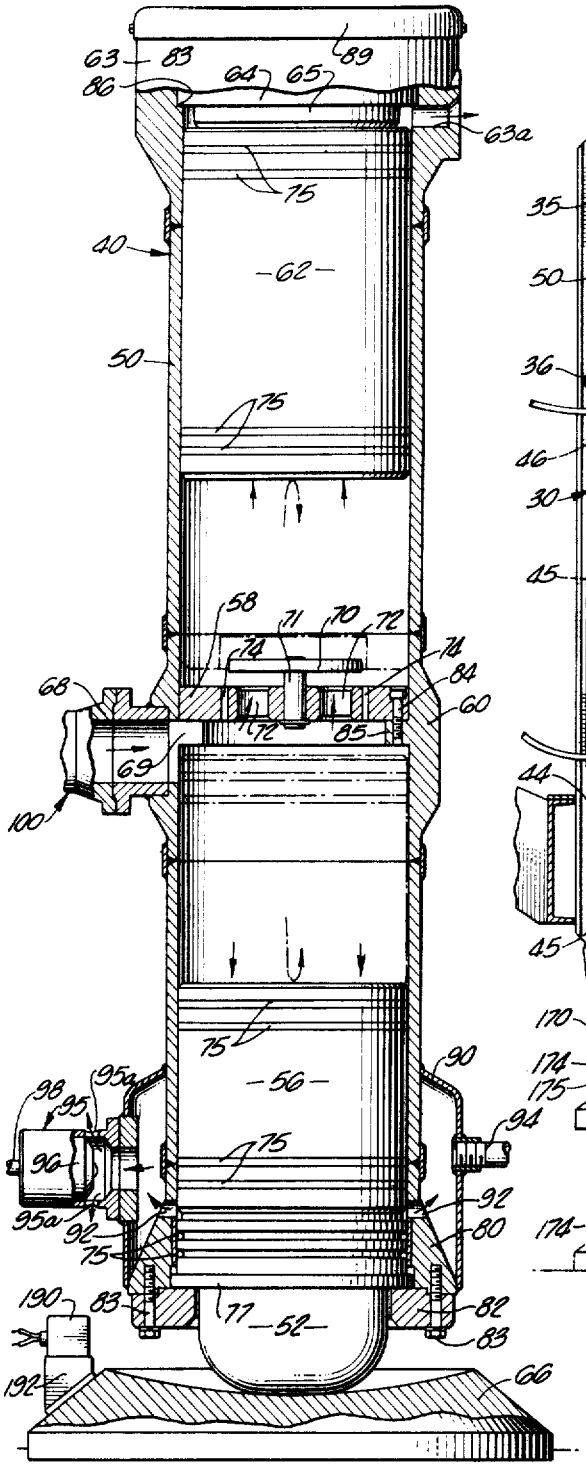
Figure 7:
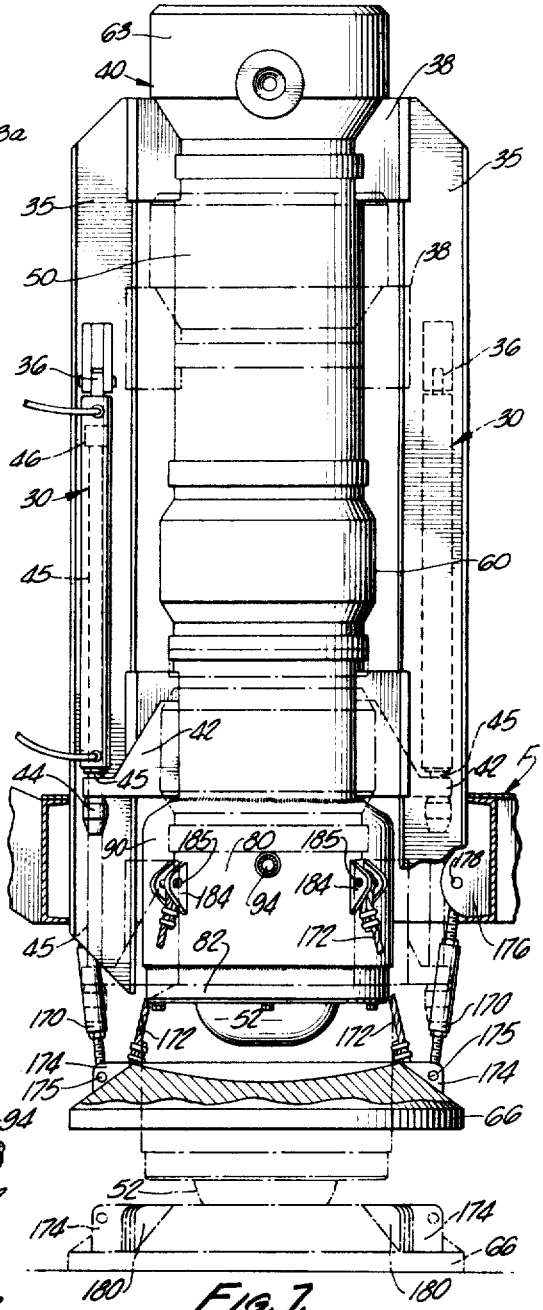
Figure 8:
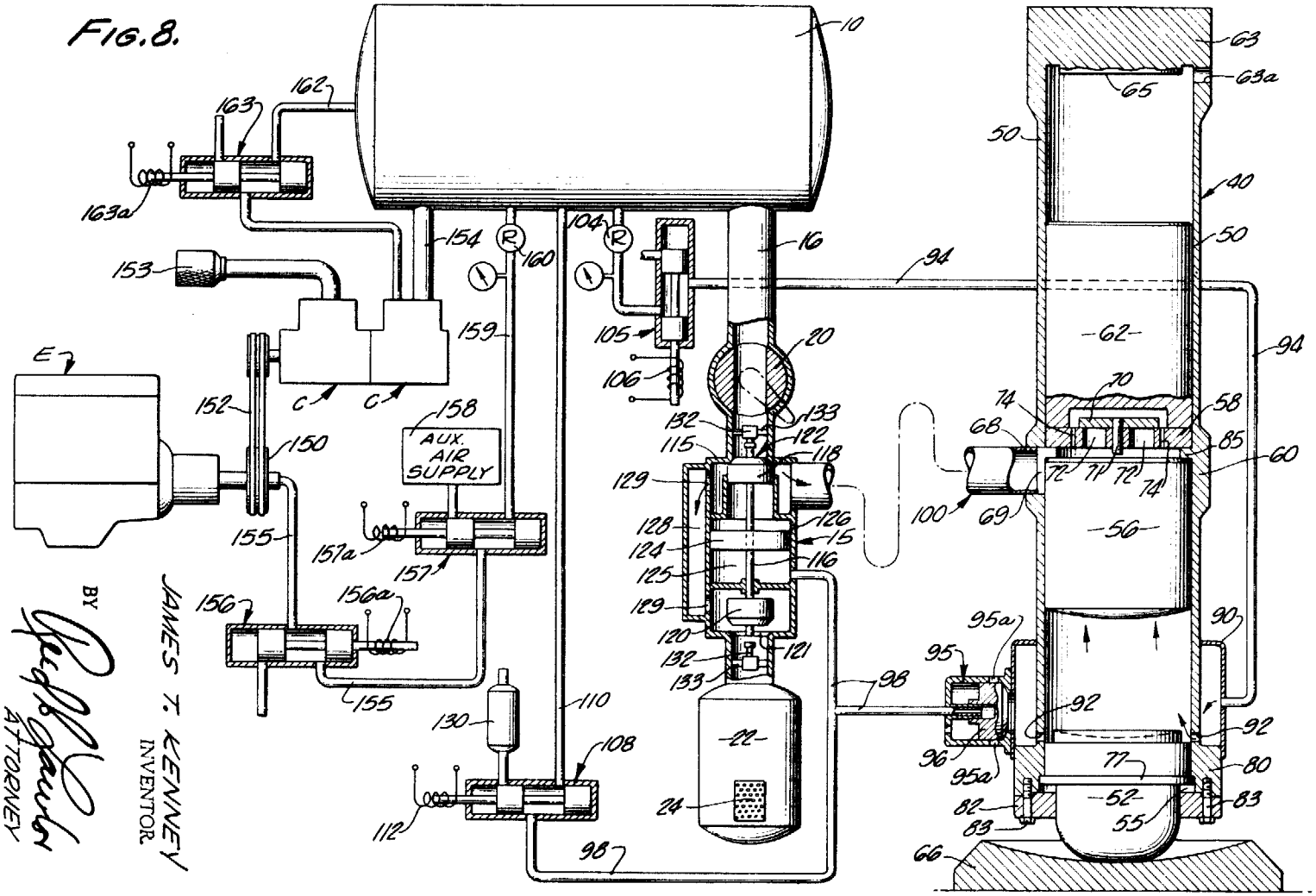
Figure 9:
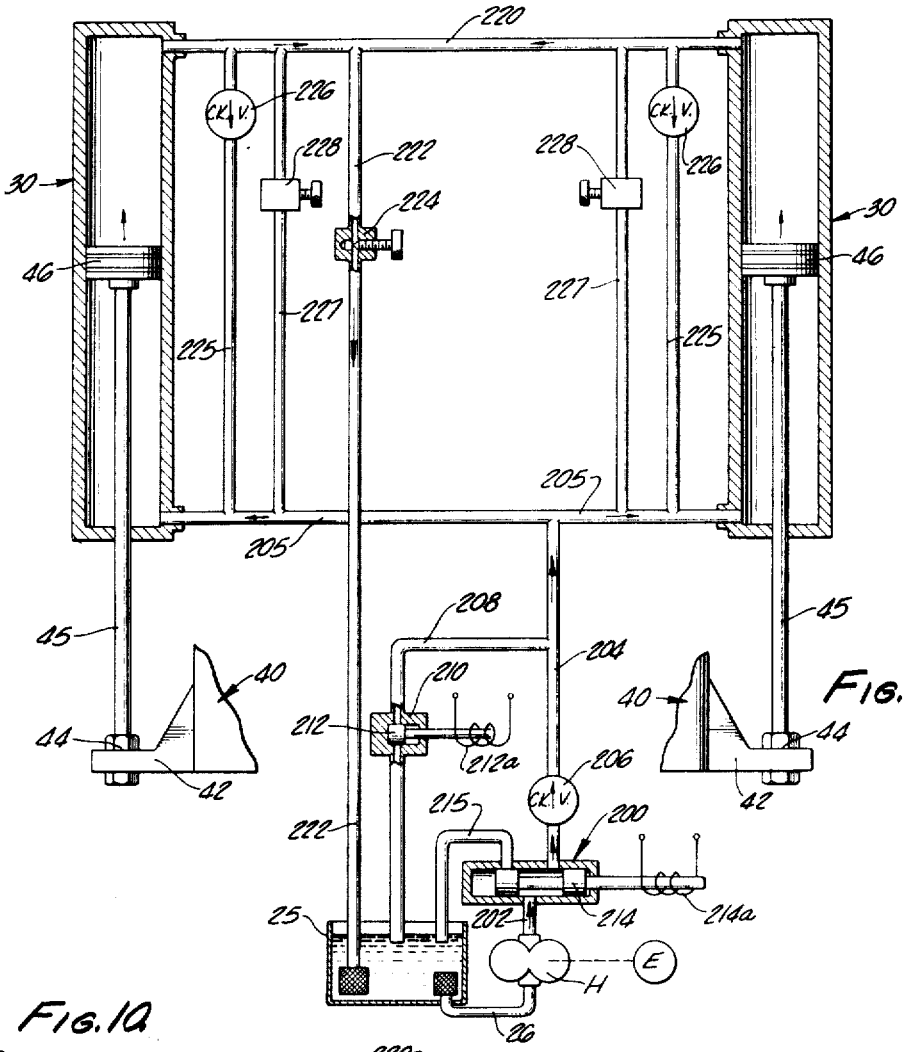
Figure 10:
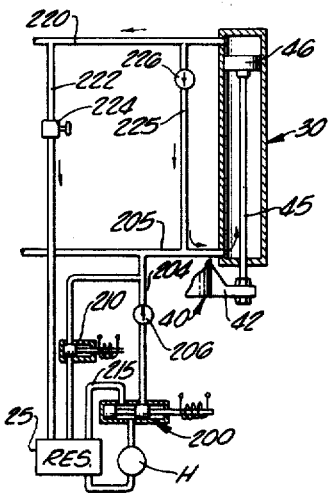

FIGS. 4 and 5 are cross-sections taken from the lines 4—4 and 5—5 respectively of FIG. 3;

FIG. 6 is a vertical section similar to that of FIG. 3 illustrating the relationship of various parts at the shock producing stage;

FIG. 7 is principally a vertical elevation of the apparatus of FIGS. 3 and 6 on a somewhat smaller scale and illustrating particularly the means for positioning the shock producing mechanism at various stages of use and actuation;

FIG. 8 is a diagrammatic view of various actuating and control parts of the mechanism illustrated in operational relationships immediately before commencement of an earth shocking phase;

FIG. 9 illustrates diagrammatically a catching system;

FIG. 10 indicates a catch position of the parts; and

Figure 11:
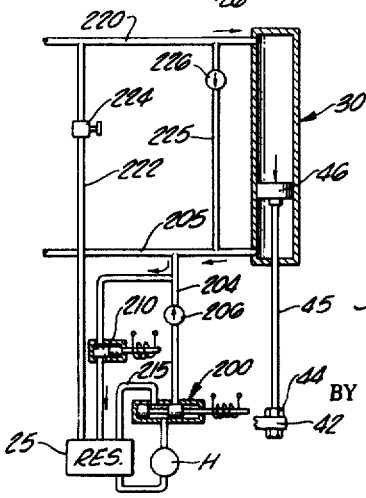

FIG. 11 indicates a lowering position of the parts.

Figure 1:
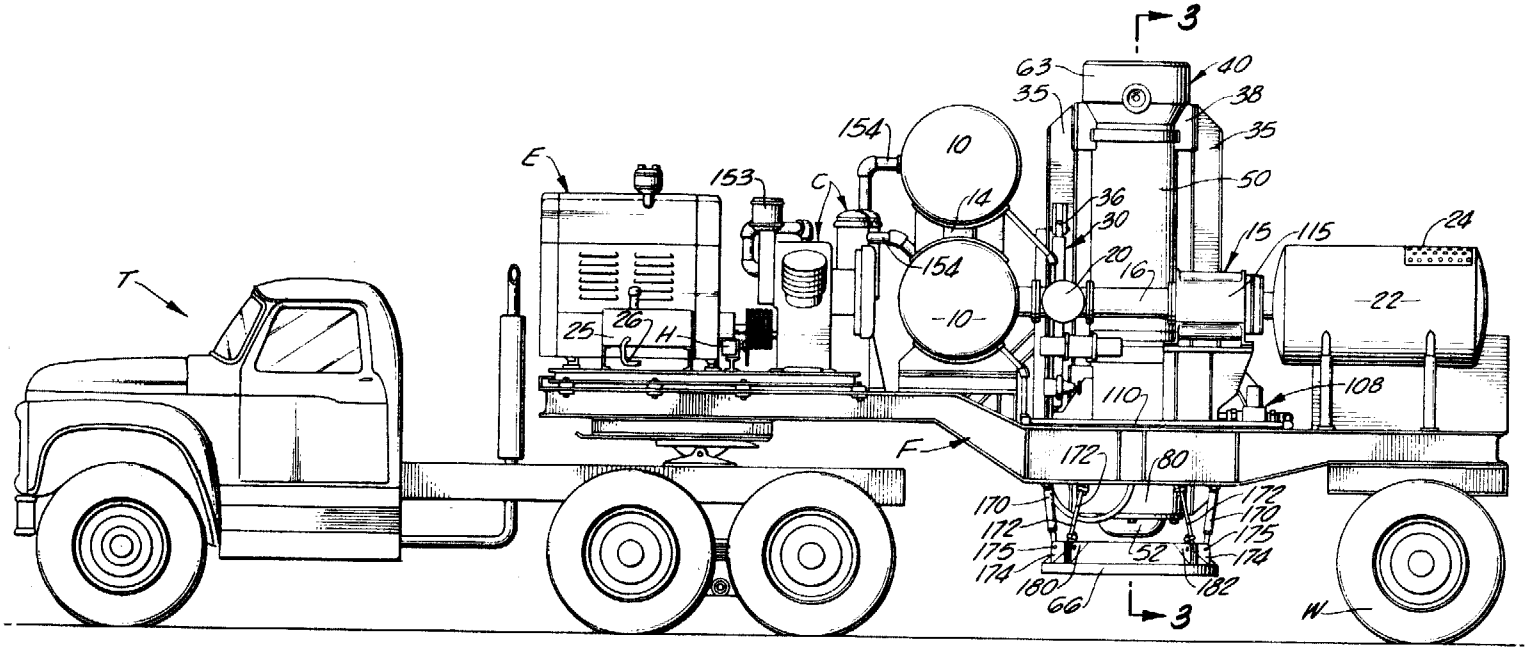
FIG. 1 is a side elevation of a truck body and truck trailer shown equipped in accordance with the present invention.

As illustrated in FIG. 1, a motor vehicle in the form of a six-wheeled powered truck T is employed to pull a trailer including a heavy trailer frame F supported at its rearward end by wheels W. The forward end of the frame F carries an engine unit E which actuates a hydraulic pump as at H, and also actuates air compressors C with filters to supply air at high pressure to two tanks 10. The air tanks 10 are so connected at 14 as to function as one and to provide a large reservoir or supply of air at an approximately constant high pressure. The pressure is many times atmospheric pressure and may be, for example, about 150 p.s.i. to 160 p.s.i.

Figure 2:
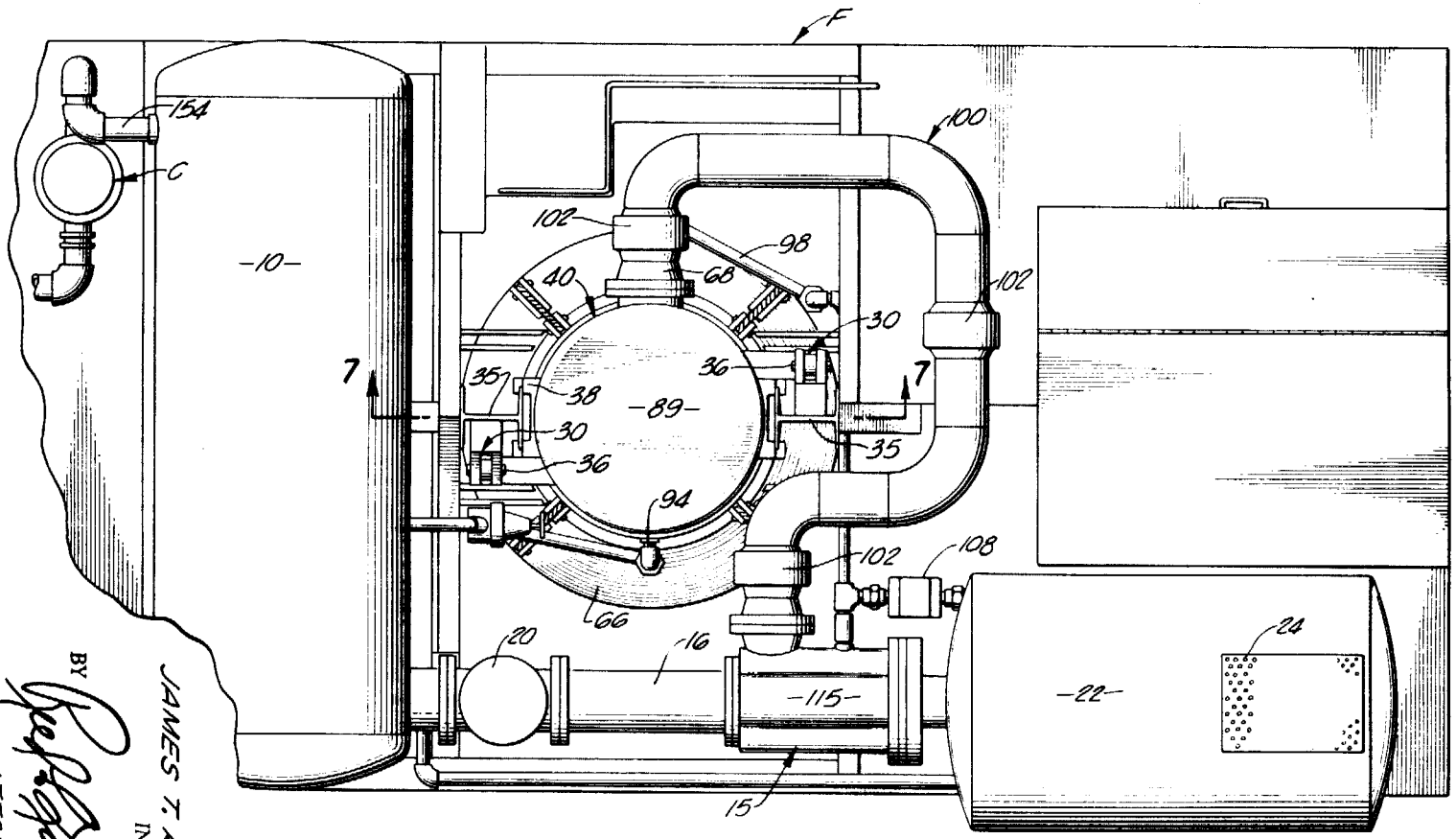
FIG. 2 is a top plan view of the apparatus of FIG. 1, which is carried on a trailer structure.

The two high pressure air tanks 10 supply the high pressure air in large volume to a high pressure, high volume quick-acting air valve 15 for actuation of the apparatus presently to be described. As indicated in FIGS. 1 and 2, such air may be supplied to the valve 15 directly from the lower tank 10 via a large high capacity air line 16 controlled by a large ball valve 20 in the line 16. In general, the quick-acting valve 15 is in part under automatic control and in part under manual control of the operator as hereinafter to be described. At the beginning of a day's operation the valve 20 is opened manually in preparation for operation and subsequently manually closed when test operations are completed. A muffler drum 22 vented at 24 is connected to the valve 15 to exhaust the latter after each actuation.

The hydraulic pump H, which is supplied by a nearby oil reservoir 25 and connecting line 26 located adjacent the engine E, furnishes hydraulic pressure by way of appropriate oil lines (later to be described) to two cylindrical hydraulic lifters 30 indicated in FIGS. 1, 2, and 9 and diametrically disposed as best shown in FIGS. 2 and 7 where they appear vertically arranged alongside upstanding rigidly braced guide rails 35 to whose upper ends the cylinders 30 are appropriately affixed as by means of ears and pivots seen at 36. The lower ends of the guides 35 are affixed to appropriate portions of the trailer frame F as best illustrated in FIG. 7.

The function of the vertical guides 35 and the hydraulic cylinders 30 is to position and actuate, as by means of a crosshead 38, a vertically reciprocal housing or "cannon" which is circular in cross-section and generally indicated at 40 and which hangs in a well within the frame F between the guides 35. The cannon 40 is provided adjacent its lower end with diametrically opposed lifter arms in the form of brackets 42 to whose outer ends there are affixed at 44 the lower ends of piston rods 45 for pistons 46 of the hydraulic cylinders 30, whereby the latter may operate to the lift cannon 40 as required or the cannon may drive the piston rods up in the catching operation following impact.

The impactor cylinder or cannon 40 comprises as a principal portion an elongated cylindrical sleeve or shell which, as illustrated in FIGS. 3 and 6, is conveniently composed of several cylindrical sections welded together as indicated. This shell or impactor cylinder 50 carries within its lower end a piston-like anvil member 52 which, in the best form, is composed of one piece, as illustrated. The anvil member has a relatively short stroke range, for example, 1 in., as illustrated at 55. Above the anvil member 52 there is located a reciprocable driving or impacting piston 56 which operates below an apertured valved plate or thick diaphragm 58 fixed in position in an enlarged middle cylinder section 60. Above the valved diaphragm there is located a reciprocating heavy recoil piston 62 which operates as an impact counterbalancing member. The recoil or balance piston 62 is of substantially greater mass than the impacting piston 56. The top of the shell 50 is provided integrally, as by welding, with an enlarged top section 63 (FIGS. 3 and 6) having an atmospheric vent 63a and closed with an appropriate cylinder head 64 having a central platform portion 65.

The purpose of the present structure is to strike a powerful blow which is to be transmitted to the underlying earth structure. This purpose is achieved through the medium of the piston 56 impacting upon the anvil 52 and an appropriate earth contacting member here represented by an impact base plate or ground plate 66 underlying the cylinder 50, its contained anvil 52, the impacting piston 56 and the recoil piston 62. This action is effected through the medium of large-volume high-pressure air supplied by way of the quick-acting valve 15 through a high-volume high-pressure connection 68 supplying a large inlet port 69 provided in the middle cylinder section 60. To impart the required sharp, powerful blow by the impacting piston 56, the latter will have previously been elevated, as hereinafter to be described, to an upper position immediately below the plate 58 as indicated by the broken lines in FIG. 6 and in the positions of FIGS. 3 and 8. Thus, upon opening the valve 15, the impacting piston 56 is forcibly propelled downward to the lower position illustrated in FIG. 6 to impart the required blow to the earth plate 66. At impact, the rate of travel of the piston 56 may approximate, for example, 50 feet per second.

In order to dissipate, in part, the powerful upward reaction force generated when high pressure air is introduced through the port 69, the plate 58 is provided on its upper side with a vertically movable gravity-controlled flat plate valve 70 having a stem 71. High air pressure passes through relatively large holes 72 in the plate 58 to the underside of the recoil piston 62 which is lifted by such air approximately to its position indicated in FIG. 6. If it were not for the presence of the recoil piston 62 and the valved diaphragm 58 with its apertures 72, the whole cylinder 50 would be driven upward with about the same momentum that acts to drive the impacting piston 56 downward, with the result that the whole structure could be lifted off the ground. But with the structure shown, the high pressure air passing the valve 70 lifts the recoil piston 62 against the force of gravity and against the force of air being compressed above the balance piston 62 within the upper portion of the cylinder 50. The amount of such force transferred to the cylinder 50, and tending to lift the cylinder, is regulated by the lateral vent hole 63a in the top cylinder section 63.

After the high pressure air above the impacting piston 56, which produces the sharp blow required, has been vented from the system (as hereinafter described) and rebound force against the recoil piston 62 has spent itself, the plate valve 70 drops and the recoil piston 62 starts to fall under the force of gravity. Closing of the plate valve 70 covers the relatively large holes 72 but leaves open an adjustable number of much smaller holes 74 around the valve 70 which gradually bleed out the body of air trapped under the balance piston 62 so that the piston 62 settles slowly downwardly to its initial position of FIG. 3 without producing a large downward impact on the plate 66. In normal operation, a catching procedure (later described) prevents the anvil 52 from falling on the earth plate 66 after rebounding therefrom after impact.

From the standpoint of the impacting operation, the above described vertically movable parts are now all in their lowermost positions. Rebound effects of the impactor cylinder 50 (cannon 40) are described hereinafter.

With respect to structural details of this impacting mechanism, each of the piston-like elements 52, 56 and 62 is provided with appropriate piston rings variously indicated at 75 (FIG. 3). The anvil 52 is shown (FIG. 3) as having an annular positioning or stop flange 77 which engages at its upper side against an annular shoulder 78 of the enlarged lowermost section 80 of the cylinder 50. This shoulder 78 limits the upward movement of the anvil 52. To limit the downward movement of the anvil 52 at the gap 55, the bottom of the lower cylinder section 80 carries a demountable retaining ring 82 held in position by bolts 83 to engage under the flange 77. The diaphragm 58 is anchored in position, as by means of bolts 84 (FIG. 3), against an internal integral annular flange 85 of the intermediate cylinder section 60. The cylinder head 64 in the enlarged top 63 of the cylinder 50 is provided with a depending central platform 65 for engagment by the upper end of the recoil or balance piston 62 in case the latter rises high enough against the compressed air body in the upper part of the cylinder 50 to make contact. Positioning of the lower end of the head 64 is accomplished through the medium of an annular underlying shoulder 86 in the top cylinder section 63, and the upper end of the head 64 is positioned through the medium of an appropriate ring structure 88 of sectional construction (such as seen in FIGS. 3 and 4) let into a corresponding inwardly directed groove in the inner wall of the cylinder section 63. Desirably the top of the cylinder section 63 is closed by a dust plate 89.

For the purpose of lifting the impacting piston 56 into its initial elevated position preceding an impact blow (as previously noted), and for the further purpose of providing a surge chamber to absorb high pressure peaks below the impacting piston 56 at the end of an impact stroke, means are provided at the lower end of the cylinder 50 to supply low pressure air under the impact piston 56 at a pressure adequate to raise it into its initial operating or starting position. This surge chamber is provided within an annular housing 90 that is welded to the lower end of the assembled cylinder 50, the upper end thereof being welded, as shown, to a smaller cylinder portion and the lower end being welded to the enlarged lower cylinder section 80. Ports 92 through the section 80 are positioned to supply such low pressure air between the anvil 52 and the impacting cylinder 56, and similarly to vent air from the space between these two parts. Low pressure air is supplied continuously to the surge chamber 90 through a low pressure air line 94, and the chamber 90 is to be vented through a relief or vent valve 95 via ports 95a to atmosphere as best indicated in FIG. 8.

The relief valve 95 includes a valve piston 96 (FIG. 8) working also under the influence of appropriate pilot air pressure supplied from the tank 10 by a pilot pressure line 98 against a very small inner pressure surface of the piston 96. With this arrangement, air pressure of 6 to 10 p.s.i. above atmospheric pressure supplied by the line 94 will act to elevate the impacting piston 56 to the initial or starting position, as indicated in FIG. 8, when the valve piston 96 is closed by the pressure in the line 98. When high-pressure large-volume air is supplied to energize the impacting piston 56 as previously indicated, the air trapped under the impacting piston 56 and in the surge chamber 90 produces an effective cushion to guard against subsequent impacts from bounce of the impacting piston 56 on the anvil 52. This effect is obtained because the main valve 15 and the surge chamber vent valve 95 are closed by the pilot pressure in the line 98, as by means of a solenoid controlled valve, about 0.01 to 0.02 second before actual impact of the piston 56. Thereafter, the pressure under piston 56 resulting from actual impact effect acts to open the valve 95 momentarily to vent the surge chamber 90. Under these conditions, in actual practice the main valve 15 remains open only about one-tenth (0.1) of a second.

High-pressure high-volume air to the inlet port 69 of the cylinder 50, for the purpose of actuating the impacting piston 56, is passed through the quick-acting valve 15 through the medium of a high capacity swiveled connecting line 100 which is provided, in the form illustrated, with three swinging joints 102 (FIG. 2), one being connected at the outlet of the quick-acting valve 15, another at the inlet 69 to the cylinder 50, and the third at an intermediate position in the line 100. These three swinging joints 102 are formed of mutually rotatable coupling elements and are partially flexible thus permitting the cylinder 50 to rise and fall with respect to the quick-acting valve 15 and the trailer bed with such swinging movements of the various parts of the line 100 as are necessary.

A suitable system of air pressure controls are indicated in FIG. 8. Here the high pressure, e.g. 160 pounds of air from the tank 10 may be reduced and furnished to the low pressure line 94 for the surge chamber 90 by way of a reducing regulator 104 and an appropriate three-way valve 105 under control of a solenoid 106. Pilot air pressure to the line 98 for actuating the vent valve 95 may be supplied from the tank 10 to a three-way valve 108 by a relatively small supply line 110, and the valve 108 may be controlled as desired from a solenoid 112.

As also seen in FIG. 8, the air valve 15 includes a housing 115 mounting a combined piston and valve stem 116 at whose upper end (as illustrated) there is mounted a high pressure air inlet piston valve 118 and at whose opposite end there is mounted an air exhaust valve 120. The valve 120 controls a large exhaust or outlet port 121 in the housing 115, and the valve 118 controls an equally large inlet port 122. Mounted upon the valve stem 116 between the two valves 118 and 120 is a relatively large actuating differential piston 124, working in a cylindrical inner chamber 125, whose underside is pressurized by the pilot pressure from the pilot pressure line 98. When pressure in the chamber 125 is sufficiently reduced through the line 98 by the control of the solenoid 112, high pressure from the tank 10 via the line 16 working against the upper side of valve 118 opens the latter and closes the valve 120. The projected overall area of valve 118 is greater than that of the valve port, thus resulting in a quick opening of the valve when the opening operation is initiated. This snap action occurs because an extra opening force is applied as soon as the valve is "cracked." High pressure air in large volume then passes through the large supply line 100 to actuate the impacting piston 56 suddenly to impact the anvil 52 as previously described.

Immediately thereafter the air line 98 is energized by way of the solenoid 112 to move the piston 124. This is possible because the upper side of the large differential piston 124 is permanently exposed to atmospheric pressure through a small vent 126 in the housing 115, and the undersurface of the piston 124 is much larger than the area of the piston valve 118. Thus, the pilot pressure against the piston 124 quickly snaps the valve 118 up to closing position against the high pneumatic pressure in the tank 10 and closes the high pressure port 122. The valve 120 is simultaneously opened and the high air pressure above the impacting piston 56 is quickly vented past the closed valve 118 to a by-pass chamber 128 via appropriate upper and lower ports 129 and past the exhaust valve 120 through the port 121 into the muffler drum 22, thus quickly releasing the high pressure above the impacting piston 56 and below the recoil piston 62 permitting the pressure in the cylinder 50 to be reduced to atmospheric pressure. Substantially, when it is desired to open the high pressure valve 118 again, the pilot pressure in the line 98 is again released through the three-way valve 108 to vent the inner valve chamber 125 via a muffler 130, whereby again to open the high pressure valve 118 and energize the impacting piston 56 and the recoil piston 62. At opposite ends of the valve housing 115, hydraulic and/or spring snubbers 132 are desirably mounted on support spiders 133 or the like in the adjacent large air passages in order to cushion the terminal movements of value stem 116.

Other controls indicated in FIG. 8, and involving the fluid pressure producing mechanism, include a pneumatically operated clutch 150 connecting the engine E by way of V belts and V pulleys 152 to the high pressure air compressor C to supply high pressure air drawn in through filtering means 153 to the tanks 10 by supply lines 154. Air under pressure for actuating the pneumatically operated clutch is obtained from a line 155 containing a three-way valve 156 under the control of a solenoid 156a. Air under appropriate pressure to actuate the pneumatic clutch 150 is furnished through a three-way valve 157 from an auxiliary or stand-by air supply 158 or from a line 159 fed by the high pressure tank 10 through a pressure regulator 160. Actuation of the three-way valve 157 is effected as desired through a corresponding solenoid 157a. In order to regulate the air compressors C, air in one of the tanks 10 is sampled and fed back through a line 162 and a three-way valve 163 under the control of a solenoid 163a or the like.

When used for seismographic exploration, the truck and trailer equipment, illustrated in FIG. 1, are transported into the area to be tested. For this purpose, the cannon 40 and the earth contacting base plate 66 through which vibrations are to be transmitted to the underlying earth, are suspended from the frame F as illustrated in FIG. 1. Having reference particularly to FIGS. 1 and 7 such means for suspension include four turnbuckles 170 connecting the impact plate 66 to the frame F and four flexible cables 172 connecting the impact base plate 66 with the enlarged lowermost cylinder section 80 of the cylinder 50 of the cannon 40. The lower end of each turnbuckle is detachably connected between a pair of corresponding ears 174 integrally formed on the base plate 66, such connection being made through the medium of a removable pin 175 or the like. Similarly, the upper end of each turnbuckle 170 is detachably connected to the frame F through the medium of ears 176 fixed on the frame F, such connection being made as by means of a removable pin 178.

In somewhat similar fashion, the lower end of each of the cables 172 is fixedly connected between a pair of ears 180 integrally mounted upon the base plate 66, and by means of appropriate pins 182 as seen in FIG. 1. The upper ends of the flexible cables 172 are supported between pairs of ears 184 fixedly secured to the outer vertical wall of the lower enlarged cylindrical section 80 of the cylinder 50, pins 185 or the like being employed for this purpose. These ears 184 may be welded either to the surge chamber housing 90 as indicated, or to the lowermost, largest portion of the lower cylinder section 80, or may overlap the joint between them.

The length of each of the cables 172 is such as to allow considerable slack, for example, about 6 inches in each, when the parts are down in operating position with respect to the earth, approximately as indicated in broken lines in FIG. 7. With this arrangement, the entire operating unit may be transported from a central location to an area out in the field to be tested, with the parts suspended in the full line position illustrated in FIG. 7. Here, the earth impacting base plate 66 is suspended from the frame F by the turnbuckles 170. The cannon 40 is then usually lowered to rest on the base plate 66 in a position somewhat as seen in FIG. 6, the cannon load thus being carried in elevated position between the guide rails 35 on the turnbuckles 170.

After the equipment has been transferred to the testing site, or shot point, the engine E is started and the required air pressure, e.g. 160 p.s.i., developed in the tanks 10, and the required hydraulic pressure in the hydraulic tank or oil reservoir 25. At this time, the hydraulic lifters 30 may be actuated to elevate the cannon 40 to high enough position to take the slack out of the cables 172 and relieve tension from the turnbuckles 170, the load of the impact base plate 66 thus being taken on the cables 172. The turnbuckles 170 may thereupon be removed by removal of their pins 175 and 178.

Under these conditions, that is, with the cannon 40 elevated and supported on the hydraulic lifters 30, thereby suspending the earth contacting base plate 66 on the cables 172, the whole equipment may either be moved short distances from one test location to another, or the cannon and base plate 66 lowered to implant the base plate 66 upon the ground for test operations, that is to produce sharp impacts creating seismographic vibrations to be picked up and recorded on appropriate cooperating recording apparatus in a nearby recording truck. Also, in this connection, a seismometer 190 and a support 192 indicated in FIG. 6 may be mounted on the base plate 66 to transmit to the recording apparatus an electric signal generated in response to the impacts to indicate the exact times of impacts.

As a preliminary stage to any testing operation, it is important to settle or implant the earth contacting base plate 66 firmly on the ground surface where tests are to be made. This may effect a slight penetration of the underside of the base plate 66 into the earth as indicated in FIG. 6. Partially this would come about by settling the full weight of the cannon 40 and its contained pistons and anvil 52 upon the base plate 66, regardless of the contour of the underside of the base plate 66. This implanting or preseating may be further effected by programming the action of the three-way valve 108, under control of the solenoid 112, so that the main high pressure valve 118 will be open for only a short time and thus transmit somewhat less than full impact force to the impacting piston 56. Thus, the impacting piston 56 will deliver a partial blow to the anvil 52 and hence to the base plate 66, thereby firmly implanting the base plate 66 without, however, transmitting the full impact needed for a seismographic recording. However, by programming the action of the three-way valve 108, thus opening the high pressure valve 118 for a longer time, a full impact may be used for making a recording.

The base plate 66 having been planted or preseated, if so desired, a full impacting force is next imparted to the impacting piston 56 (the latter having been preliminarily raised to the starting position indicated in FIG. 8) and a full blow transmitted for recording seismic waves by means of recording equipment in the neighborhood. Such a recording having been taken, subsequent blows may be made and recorded, or the cannon 40 and base plate 66 may be lifted by the hydraulic lifters 30 to a position such as indicated in full lines in FIG. 7 (the turnbuckles 170, however, being now removed as previously indicated), and the equipment transferred a relatively short distance to whatever new site is to be employed for application of a subsequent impact. Here, the presenting operation can again be performed if desired. A full impact is then produced for recording by the cooperating seismographic recording equipment in the vicinity. By those means, as many as 1500 seismographic recordings may be made by a single operating crew with a single impactor in one day in an area being surveyed.

Another important aspect of the present apparatus is the hydraulic mechanism including the hydraulic lifter cylinders 30 and a catch feature employed in conjunction therewith to temporarily hold the cannon 40 in elevated position when the cannon rebounds vertically following impact upon actuation of the impacting piston 56. In this connection, when the impacting piston is driven downward by the high pneumatic pressure employed, as heretofore described, and strikes the anvil 52 to impart the required powerful earth impacting blow upon the earth impacting plate 66, not only does the impacting piston 56 within the cannon rebound, as has been previously described, but, notwithstanding the effect of the recoil piston 62, the entire cannon structure 40 also rebounds upward between the guide rails 35, even to the extent that, if not properly controlled, the whole trailer structure including the frame F and equipment carried thereby are lifted somewhat.

The mass and excursion of the recoil piston 62 are proportionally sufficiently greater than the mass and excursion of the impacting piston or hammer 56 so that the upward recoil of the cannon 40 does not reach its upper limit until after the impact blow of the piston 56 has been delivered to the underlying earth via the base plate 66. Thus, the impacting piston or hammer 56 may have a weight of 2000 pounds and a stroke of 22 inches in a 21 inch diameter cylinder, and the recoil piston 62 have a weight of 3700 pounds and a stroke of 19 inches in the 21 inch diameter cylinder. In this unit, the anvil 52 has a weight of 1000 pounds, the ground plate 66 typically weighs about 4000 pounds and the weight of the cannon 40 as a whole 11,000 pounds.

Also in order to prevent a second impact due to rebound of the cannon 40 as a whole, an automatically actuating hydraulic catching mechanism is employed. This construction and its controls are illustrated in FIGS. 9 and 10 in particular. Such structure obviates a very large weight of the piston 62 or greater travel thereof.

In FIG. 9 the hydraulic mechanism is illustrated in position for normally elevating the cannon 40 to lift it into supported position for transport or other desired purpose. Here there are illustrated the two lifter cylinders 30 with their piston rods 45 and pistons 46, the lower end of the cannon 40 being shown as carried on the lower ends of the piston rods 45 by means of previously described bracket arms 42. The hydraulic oil reservoir 25 and its line 26 are shown supplying the hydraulic pump H actuated by the engine E. A three-way distributing valve 200 supplied by a line 202 from a hydraulic pump H supplies a high pressure line 204 leading to branches 205 feeding the lower ends of the cylinders 30 beneath the pistons 46. The line 204 is equipped with a check valve 206. Beyond the check valve 206 a return line 208 feeds back to the reservoir 25 by way of a valve 210 having a movable valve member 212 under the control of a solenoid 212a. Similarly a movable valve member 214 of the three-way valve 200 is under the control of a solenoid 214a. The valve 200 is provided with a by-pass or return line 215 to pass the hydraulic fluid back to the reservoir 25 when the valve 200 is in position (as shown in FIGS. 10 and 11) to cut off hydraulic pressure to the main line 204.

The return line valve 210 in the line 208 is here considered as normally closed as shown in FIGS. 9 and 10. When the valve 200 is open to supply hydraulic pressure to the pistons 46, the pistons 46 rise in their cylinders 30 to elevate the cannon 40. Under these circumstances oil in the cylinders 30 above the pistons 46 is returned to the reservoir 25 via branch return lines 220 leading to a common return line 222. For the purpose presently to be explained, the line 222 is provided with a constriction member 224 which in the form illustrated is conveniently a needle valve. When the pistons 46 are raised to the tops of the cylinders 30, the valve 200 may be moved to its closed position shutting off line 204. With the valve in this position oil from the pump H is recycled back to the reservoir 25 if operation of the pump H is continued. Check valve 206 prevents return of oil past the valve 200, even if the latter were to be left open when the pump H is not operating. With the return valve 210 closed, the cannon 40 is automatically held in elevated position, this being true even though there are provided by-pass lines 225 disposed alongside the cylinders 30 between the adjacent portions of the lines 205 and 220. This is because another check valve 226 is provided in each of the respective lines 225.

When it is desired to lower the cannon into such position as indicated in FIGS. 6 and 7, the valve 210 is opened and the pressure oil under the pistons 46 travels back by way of the lines 205 and 208 to the reservoir 25. During the cannon lowering operation oil is drawn up from reservoir 25 through lines 222 and 220 to fill the void that would otherwise tend to develop in the cylinders 30 above the pistons 46. The valve 210 may be a multiple position valve so that the lowering of the cannon 40 may be slow or fast as desired according to the position of the valve 210.

When the impacting action of the impacting piston 56 of the cannon is to be undertaken, the valves 200 and 210 will be closed and the check valve 206 in the line 204 will pervent any possible return of hydraulic fluid past the valve 200. Thus, when the cannon 40 rebounds upward upon energization of the impacting piston 56 therein to strike the required powerful blow on the earth contacting plate 66, the pistons 46 will be driven upward by such rebound action through the medium of their piston rods 45. Oil required to supply the potential vacuum beneath the pistons 46 will be derived from the portion of the cylinders 30 above the pistons 46, this oil being bypassed through the adjacent respective lines 225 and the respective check valves 226. Thus, when the pistons 46 approach the upper ends of their travel, and the rebound of the cannon 40 has been dissipated, descent of the cannon 40 which, if permitted, would produce a subsequent impacting and rebounding action, is prevented by reason of the check valves 226, together with the check valve 206 and the lowering valve 210. The cannon 40 is now held in this elevated position until the operator desires to lower it to initial position through the medium of the lowering valve 210. In addition, by-pass lines 227 paralleling the lines 225 and containing constriction valves 228 serve to by-pass just enough liquid so that the cannon 40 can automatically lower gradually after impact.

Inasmuch as the cross-section of each piston rod 45 is substantial and the rod occupies a substantial proportion of the volume of its cylinder 30 below its piston 46, there is a surplus of hydraulic fluid above the piston 46 which will not be accommodated by bypass through the respective line 225 to the underside of the piston. To accommodate this surplus, it must be returned to the reservoir 25 by the line 222. However, in order to avoid such rapid return of oil to the lines 220 and 222 that there will be insufficient bypassing of oil in the line 225 by way of its check valve 226 to accommodate proper movement upward of the piston 46, a constriction is provided in the line 222 as indicated by the needle valve 224 illustrated. While other forms of constriction may be employed, the needle valve 224 is convenient because it is readily adjustable to conditions as they may vary. It will be appreciated that this constriction nevertheless permits adequate return of oil from the upper side of the piston 46 back to the reservoir 25 when required. Similarly, the constriction at the valve 224 also permits adequate return of oil from the reservoir 25 upwardly through the line 222 to provide for descent of the pistons with the cannon 40 when desired, such descent being indicated in FIG. 11.

With the structure herein disclosed, it is possible to move the truck and trailer to an area to be surveyed, lower the impactor cylinder 50 of the cannon 40 to place the ground or base plate 66 upon a chosen earth spot, and there present the plate 66 either by imparting a light or full impact blow with the impacting piston 56 or by raising the impactor cylinder 50 a suitable distance with the hydraulic lifter cylinders 30 and then dropping the impactor cylinder 50 by opening the lowering valve 210.

Thereafter, the impacting cylinder 50 is placed in its lowered position with the anvil 52 engaging the ground plate 66 as illustrated in FIGS. 3 and 8.

To impart shock waves to the underlying earth, high air pressure from the tank 10 is applied through the quick-acting high-capacity valve 15 and through the large air line 100 to the upper side of the impacting piston 56 and then vented, as previously described. The upward rebound of the cylinder and truck body due to the downward impacting movement of the piston 56 is greatly reduced through the raising of the recoil piston 62, as previously described, and the rebound of the impactor cylinder 50 as a whole as accommodated by the hydraulic cylinders 30 and their by-pass lines 225 as described above to prevent excessive after shock due to subsequent rapid fall of the cannon.

To produce another impact at the same shot point, the impactor cylinder 50 is lowered to the ground plate 66 by opening the valve 210. To move the aparatus to another test spot nearby, the cannon 40 as a whole is elevated by the hydraulic cylinders 30 and their piston rods 45 and the pistons 46 high enough to suspend the ground plate 66 from the cylinder 50 a suitable distance above the ground. When the apparatus is to be transported a considerable distance, the turnbuckles 170 are replaced, whereby to suspend the cannon and ground plate 66 from the trailer frame F and permit relief of the hydraulic system.

While one embodiment of the invention has been described in considerable detail, it is to be understood, of course, that the invention is not restricted thereto but that it may be embodied in many other forms. It will therefore be understood that many changes can be made in the methods for supplying fluid pressure to the impactor and energy to the anvil or hammer and reaction mass, and that the methods of control of the application of the pressure and for the raising and lowering of the various parts of the impactor relative to the ground, and the methods for preparing the impactor for operation and the like, may be modified in many ways without departing from the principles of the invention. Furthermore, it will be understood that the various parts may be made of different sizes, shapes, and weights from those specifically described herein while still obtaining many of the advantages of the invention. Additionally, it will be understood that the impactors of this invention may be employed for many other purposes than the generation of seismic waves. It is therefore also to be understood that the invention may be embodied in many other forms and in other ways within the scope of the claims.

The invention claimed is:

1. An impactor comprising:

an elongated impactor cylinder mountable in a vertical attitude;

a ported diaphragm spanning a middle portion of said cylinder;

a floating impacting piston disposed below said diaphragm;

a floating recoil balancing piston disposed above said diaphragm;

means for applying pneumatic impacting pressure between said pistons; and anvil means movable in the lower portion of said cylinder to receive the impact of said impacting piston for transmitting such impact to an underlying object.

2. A structure as in claim 1 wherein said means for applying pneumatic pressure includes an inlet located between said diaphragm and said impacting piston.

3. A structure as in claim 1 wherein said ported diaphragm carries an upwardly opening valve member controlling ports in the diaphragm and wherein said means for applying pneumatic pressure supplies a space between the diaphragm and the impacting piston.

4. A structure as in claim 1 wherein said means for applying pneumatic pressure includes high capacity conduit means and a high capacity valve in said conduit means which is a quick acting valve for supplying high volume air at high pressure to said cylinder.

5. A structure as in claim 4 wherein said quick acting valve has an inlet valve member for supplying the high volume of air to said cylinder and also has an exhaust valve member for exhausting said high pressure air from said cylinder.

6. A structure as in claim 5 including vent means between said impacting piston and said anvil means, a valve controlling such vent means, and a common control means for such vent means valve and said quick acting pneumatic valve means.

7. A structure as in claim 1 including means venting the upper portion of said cylinder above said floating balancing piston.

8. A structure as in claim 1 including an earth-engaging base member disposed under said impactor cylinder and anvil means for receiving impact of said impacting piston and imparting it to underlying earth.

9. A structure as in claim 8 including means for suspending said earth-engaging base member from the lower end of said impactor cylinder.

10. A structure as in claim 8 including a wheeled frame, said frame having wheels rotatably mounted thereon for transporting said frame across the surface of the earth, and means for suspending said base member from said frame.

11. A structure as in claim 1 including:

vent means between said impacting piston and said anvil means;

a valve controlling such a vent means;

valve means controlling said means for applying pneumatic impacting pressure; and a common control means for such vent means valve and said pneumatic valve means.

12. A structure as in claim 1 including a frame and positioning means on said frame for vertical movement of said impactor cylinder thereon;

hydraulic means for elevation of said cylinder on said positioning means; and control means for said hydraulic means.

13. A structure as in claim 12 including catch means in said control means for holding said cylinder elevated on said positioning means.

14. A structure as in claim 13 wherein said catch means and hydraulic means include a hydraulic cylinder with a piston therein and a bypass line between the opposite sides of said hydraulic piston, such bypass line including a check valve to pass hydraulic fluid in one direction only for latching the hydraulic piston in elevated position in its cylinder.

15. A structure as in claim 12 including means in said control means for gradual return of said impactor cylinder automatically to lower position.

16. A structure as in claim 15 including a bypass line wherein said means for gradual return is restriction means in said bypass line.

17. In a transportable impactor structure having a wheeled frame, said frame having wheels rotatably mounted thereon for transporting said frame across the surface of the earth;

a movable elongated impactor cylinder mountable on said frame in a vertical attitude;

a ported diaphragm spanning a middle portion of said cylinder;

a floating impacting piston disposed below said diaphragm;

a floating recoil balancing piston disposed above said diaphragm;

means for applying pneumatic impacting pressure between said pistons;

anvil means movable in the lower portion of said cylinder to receive the impact of said impacting piston for transmitting such impact to an underlying object; and positioning means on said frame for vertical movement of said cylinder thereon, hydraulic means for elevation of said cylinder on said positioning means, and control means for said hydraulic means.

18. A structure as in claim 17 including catch means for holding said cylinder elevated on said positioning means.

19. A structure as in claim 18 wherein said catch means and hydraulic means include a hydraulic cylinder with a piston therein and bypass means between the opposite sides of said hydraulic piston, such bypass means including a check valve to pass hydraulic fluid from the top portion of said hydraulic cylinder to the bottom portion thereof and prevent return thereof for holding the hydraulic piston in elevated position in its cylinder.

20. An impactor including:

a cylinder adapted to be mounted in a vertical position;

a ported diaphragm disposed across the middle portion of said cylinder, said ported diaphragm includes an upwardly opening gravity actuated valve for ports of said diaphragm;

the total cross-sectional area of the ports of said diaphragm thus having less cross-sectional area than that of the cylinder;

a floating impact piston disposed below said diaphragm;

a floating rebound balance piston above said diaphragm;

means to supply high pneumatic pressure between said piston beneath said ported diaphgram;

anvil means in the lower end of said cylinder under said impacting piston to receive and transmit impact from said impacting piston.

21. An impactor as in claim 20 wherein said means to supply said pneumatic pressure to said impacting piston includes a fast acting high capacity valve, such fast acting valve having an inlet valve member to pass said high pneumatic pressure to said impacting piston and an exhaust valve member for releasing such high pneumatic pressure from said impacting piston.

22. An impactor as in claim 21 including vent means between said impacting piston and said anvil means, a valve controlling such vent means, and a common control means for such vent means valve and said quick acting pneumatic valve supplying said cylinder.

23. A reboundable impactor structure including:

an impactor cylinder having a longitudinal axis and mountable with such axis in a vertical position;

impacting piston means disposed in said cylinder;

anvil means at the lower end of said cylinder engageable by said impacting piston;

means for supplying high pressure air in high volume above said impacting piston to cause the latter to impact said anvil means;

positioning means for said cylinder mountable in a vertical position;

hydraulic means carried by said positioning means and supporting said impactor cylinder for elevation of said cylinder on said positioning means; and catch means for holding said impactor cylinder in elevated position on said positioning means.

24. An impactor structure as in claim 23 wherein said hydraulic means includes:

a hydraulic cylinder having a hydraulic piston therein and carried by said positioning means and connected with said impactor cylinder for elevating said impactor cylinder;

a bypass line between the opposite ends of said hydraulic cylinder for bypassing hydraulic fluid from the upper portion of said hydraulic cylinder to the bottom lower portion thereof to bypass hydraulic fluid around the hydraulic piston; and check valve means in said bypass line to prevent return of hydraulic fluid through said bypass line from the lower portion of said hydraulic cylinder to the upper portion thereof for holding the hydraulic piston in elevated position in its cylinder upon rebound of said impactor cylinder.

25. A structure as in claim 23 including means to supply liquid from a source to said hydraulic means;

means for flow of liquid to and from said source; and restrictor means in said flow means to limit liquid flow for gradual lowering of said impactor cylinder.

26. An impactor structure including:

a transportable frame;

positioning means mountable on said frame in a vertical position;

an impactor cylinder containing impacting piston means and carried on said frame in vertical position;

means for applying high pressure actuating fluid to said impacting piston means;

anvil means mounted in the lower portion of said impactor cylinder for impact by said impacting piston means; and hydraulic means for elevating said impactor cylinder;

said hydraulic means including a hydraulic cylinder and piston for elevating said impactor cylinder, and also including means for catching said impactor cylinder in elevated position on rebound, such catching means including a hydraulic bypass line for bypassing hydraulic fluid from the top of said hydraulic cylinder to the bottom thereof and including check valve means preventing reverse flow of such hydraulic fluid and retaining said impactor cylinder in elevated position on rebound.

27. An impactor including:

a cylinder adapted to be mounted in a vertical position;

a ported diaphragm spanning a middle portion of said cylinder;

a floating impact piston disposed below said diaphragm;

a floating rebound balance piston above said diaphragm;

means to supply high pneumatic pressure between said pistons; and anvil means in the lower end of said cylinder under said impacting piston to receive and transmit impact from said impacting piston.

28. An impactor as in claim 27 including:

vent means between said impacting piston and said anvil means;

a valve controlling such vent means;
valve means controlling said pneumatic pressure means; and
a common control means for said vent means valve and said valve means controlling said pressure means.

29. In combination:
a vehicle;
an impactor structure carried by said vehicle and including;
an impactor cylinder having a longitudinal axis and mountable with such axis in a vertical position;
impacting piston means disposed in said cylinder;
anvil means at the lower end of said cylinder engageable by said impacting piston;
means for supplying high pressure air above said impacting piston to cause the latter to impact said anvil means;
positioning means on said vehicle for mounting said cylinder;
hydraulic means carried by said vehicle for raising and lowering said cylinder;
a ground engaging base plate disposed under said cylinder and anvil means for impact by the latter;
a hydraulic cylinder carried by said positioning means and connected with said impactor cylinder for elevating said impactor cylinder on said positioning means;
a bypass line between the opposite ends of said hydraulic cylinder for bypassing hydraulic fluid from the top of said hydraulic cylinder to the bottom thereof to bypass hydraulic fluid around the hydraulic piston; and
check valve means within said bypass line to check return of hydraulic fluid through said bypass line from the lower portion of said hydraulic cylinder to the upper portion thereof for locking the hydraulic piston in elevated position in its cylinder upon rebound of said impactor cylinder.

30. A structure as in claim 29 including a bypass line in said hydraulic means wherein said bypass line includes a flow restriction for gradual automatic return of said impactor cylinder to a lower position.

31. An impactor structure including:
a transportable frame;
positioning means mountable on said frame in a vertical position;
an impactor cylinder carried on said frame and containing impacting piston means;
means for applying high pressure actuating fluid to said impacting piston means;
anvil means mounted in the lower portion of said impactor cylinder for impact by said impacting piston means; and
means for elevating said impactor cylinder on said frame;

said elevating means including means for catching said impactor cylinder in elevated position on rebound.

*32. In combination:*
*a transportable frame;*
*an impactor carried by said frame for imparting a sharp impact to the surface of the earth;*
*means on said frame for raising said impactor relative to the ground to facilitate transportation of said impactor from one point to another over the surface of the earth and for lowering said impactor into ground impacting position;*
*means for energizing said impactor to apply a sharp blow to the surface of the earth and to cause said impactor to rebound upwardly; and*
*catcher means carried by said frame for catching said impactor upon rebound for temporarily holding said impactor in an upward position above the ground.*

*33. The combination as set forth in claim 32 wherein said catcher means includes a piston movable in a hydraulic cylinder between a first position and a second position corresponding respectively to lower and upper positions of the impactor, in which lower position the impactor can be energized to impart a sharp impact to the earth and in which upper position the impactor may be held to prevent the impactor from falling to produce a second blow;*
*means interconnecting said piston and said impactor for moving said piston into said second position as said impactor rebounds after applying a sharp impact to the earth;*
*and valve means for resisting movement of said piston from said first position to said second position.*

*34. The combination as set forth in claim 33 wherein said valve means comprises a check valve.*

References Cited

The following references, cited by the Examiner, are of record in the patented file of this patent or the original patent.

UNITED STATES PATENTS

| | | | |
|---|---|---|---|
| 2,898,084 | 8/1959 | Eckel et al. | 181—.5 |
| 2,933,068 | 4/1960 | Johnson et al. | 181—.5 |
| 3,106,982 | 10/1963 | Wade | 181—.5 |
| 3,189,121 | 6/1965 | Vander Stoep | 181—.5 |
| 3,209,854 | 10/1965 | Williams | 181—.5 |
| 3,215,223 | 11/1965 | Kirby et al. | 181—.5 |

FOREIGN PATENTS

| | | |
|---|---|---|
| 962,850 | 7/1964 | Great Britain. |

RODNEY D. BENNETT, Jr., Primary Examiner

D. C. KAUFMAN, Assistant Examiner